(12) United States Patent
Evans

(10) Patent No.: US 7,646,129 B2
(45) Date of Patent: Jan. 12, 2010

(54) STATOR FOR AN ELECTRIC MACHINE (75) Inventor: Steven Andrew Evans, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 11/814,222

(22) PCT Filed: Jan. 17, 2006

(86) PCT No.: PCT/EP2006/050262
§ 371 (c)(1),
(2), (4) Date: Jul. 18, 2007

(87) PCT Pub. No.: WO2006/082135
PCT Pub. Date: Aug. 10, 2006

(65) Prior Publication Data
US 2008/0191578 A1 Aug. 14, 2008

(30) Foreign Application Priority Data
Feb. 1, 2005 (DE) .................. 10 2005 004 565

(51) Int. Cl.
H02K 1/16 (2006.01)

(52) U.S. Cl. .................. 310/216.001; 310/216.106; 310/254.1

(58) Field of Classification Search .................. 310/216, 310/217, 218, 254, 216.001, 216.016, 254.1; 29/596–598
See application file for complete search history.

(56) References Cited

U.S. PATENT DOCUMENTS 6,225,725 B1 * 5/2001 Itoh et al. .................. 310/254
6,483,221 B1 11/2002 Pawellek et al.
2001/0026108 A1 * 10/2001 Tajima et al. .......... 310/156.01
2004/0104638 A1 6/2004 Yoneda et al.

FOREIGN PATENT DOCUMENTS

| DE | 102 03 272 A1 | 7/2003 |
| JP | 04372552 A * | 12/1992 |
| JP | 2000-312446 | 11/2000 |
| WO | WO 00/17986 A1 | 3/2000 |

* cited by examiner

Primary Examiner—Tran N Nguyen
(74) Attorney, Agent, or Firm—Ronald E. Greigg (57) ABSTRACT The invention relates to a stator for an electric machine, which has a core comprised of laminated sheet metal (1), the pole teeth (2) of each laminated sheet metal (1) of the core being connected to one another via respective webs (3). The laminated metal sheets (1) of the core are made from a two-state steel and, in the area of the pole teeth (2), have a high relative permeability and, in the area of the webs (3), have a section (5, 6, 7) with a low relative permeability.

22 Claims, 6 Drawing Sheets

STATOR FOR AN ELECTRIC MACHINE

CROSS-REFERENCE TO RELATED APPLICATION

This application is a 35 USC 371 application of PCT/EP 2006/050262 filed on Jan. 17, 2006.

BACKGROUND OF THE INVENTION

1. Field of the Invention

The present invention relates to a stator for an electric machine, in particular an EC motor (electronically commutated motor); the stator has a core composed of lamination plates; and the pole teeth of one or more lamination plates of the core are connected to one another by means of respective bridge pieces. The present invention also relates to a method for manufacturing such a stator.

2. Brief Description of the Prior Art

Electronically controlled electric motors are playing an increasingly important role in a series of practical applications. These are electric motors in which the required periodic switching of coils is no longer executed by means of a commutator, but instead by means of electronic switching devices. The electronic switching devices are also accompanied by a rotor position sensor in order to determine when the stator and rotor for the coils to be switched at the moment are situated in a reactive position that is favorable for the switching or that is required for the switching to occur.

Figure 7:
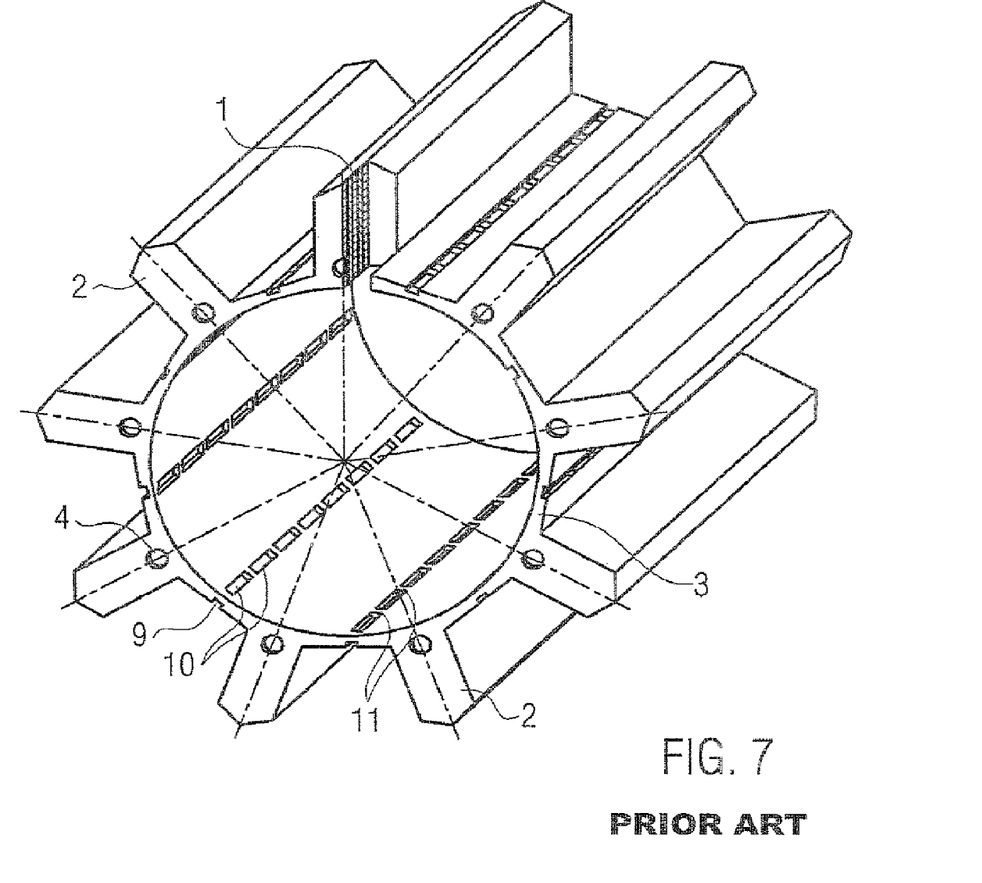
FIG. 7 is a schematic perspective view of a stator core according to the prior art (DE 198 42 948)

DE 198 42 948 has disclosed an electric motor that has a stator manufactured from a lamination stack, which is shown in FIG. 7. The individual lamination plates 1 in this case have indentations 4 in order to enable adjacent lamination plates 1 to engage with one another. The individual poles 2 are connected to one another by means of a number of bridge pieces 3, each of which is provided with a straight slotted groove 9 that is composed of a number of short openings 10 that are separated from one another by means of respective connecting pieces 11. Because of the linear embodiment of the slotted groove 9 and the multitude of connecting pieces 11, however, this known electric motor could have a relatively high detent engagement moment (if an unbeveled rotor is used) as well as a relatively low output.

Figure 8:
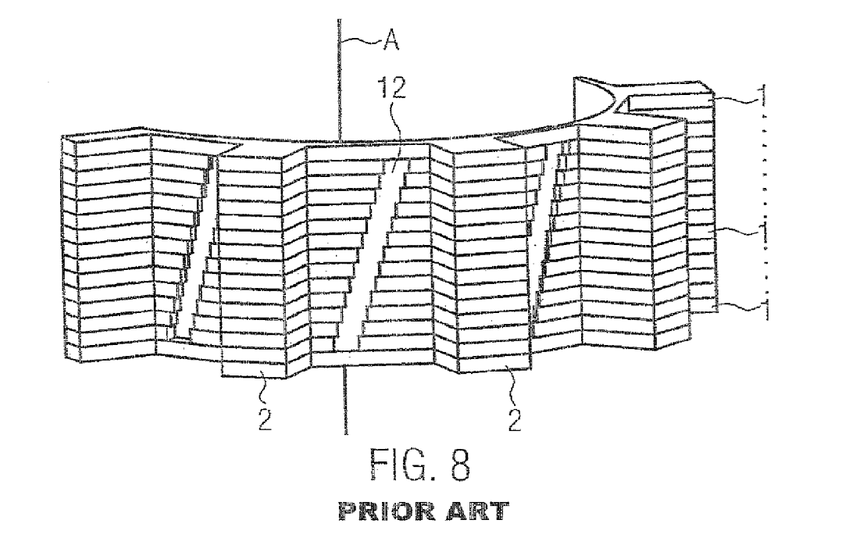
FIG. 8 is a schematic perspective view of a stator core according to the prior art (DE 102 03 272)

DE 102 03 272 A1 has disclosed a stator, which is shown in FIG. 8, for an electric machine that overcomes the disadvantages known from DE 198 42 948 in that the slotted groove 12 is embodied so that it extends inclined at a predetermined angle in relation to a center axis A of the stator. In this case, a continuous slotted groove can be respectively provided between each pair of poles 2 in the stator; the top plate 1 and the bottom plate 1 of the stator lamination stack do not have any slots or else a number of respective slotted grooves can be provided, which are offset from one another and extend parallel to one another in the direction of the center axis A of the stator; one or more plates 1 without slots are respectively situated between the individual slotted grooves.

Figure 9:
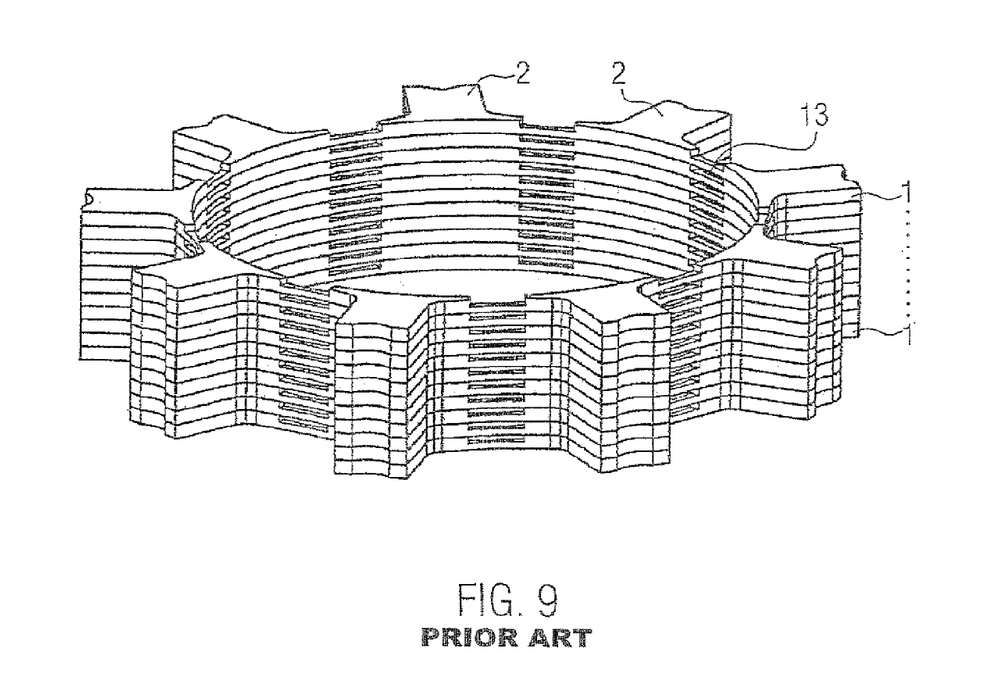
FIG. 9 is a schematic perspective view of a stator core according to the prior art (DE 102 42 404).

DE 102 42 404 A1 also describes a stator, shown in FIG. 9, which is embodied in the form of a lamination stack and constitutes part of an electric machine; the lamination stack is comprised of stacked lamination plates 1 of an essentially constant thickness and is embodied in the form of a ring with outwardly protruding pole teeth 2. In order to achieve a simpler production than DE 198 42 948 and DE 102 03 272 A1 with similar magnetic properties, the lamination plates 1, which are embodied the same for the entire stator lamination stack, have a section 13 that is situated between the pole teeth 2 and whose thickness is less than the essentially constant thickness.

All of the above-described stators share the common trait that the magnetic circuit of the stator is divided, i.e. segmented, so that the phase coils can be wound separately from the stator and then placed onto the pole teeth of the stator before final assembly of the magnetic circuit. There are many advantages to this method of stator construction. For example, the phase coils can be wound very precisely, thus achieving a higher filling factor of the gaps between the pole teeth and permitting minimization of the end windings, thus making it possible to reduce the length of the motor and consequently also to reduce costs. After the phase coils have been mounted, the stator core that has been provided with the phase coils can be press-fitted into the external flux return ring or inserted into it by means of a thermal fitting process.

The construction of the star-shaped core comprised of individual plates 1 laminated to one another is very complex. In the case of DE 198 42 948, two different forms of lamination plates 1 must be produced, namely the individual pole tooth 2 and the star, i.e. pole teeth 2 connected to one another by means of bridge pieces 3 with connecting pieces 11. These two forms of lamination plate 1 must be laminated to one another in a precise, predefined sequence in order to produce the core. The individual pole teeth 2 laminated to one another are secured only by means of indentations 4 that engage with one another as a result of which either the pole teeth 2 must have a dovetail joint at the end oriented toward the flux return ring in order to assure their mechanical stability and to fix them in their radial position or else it is necessary for the entire stator core to be encapsulated in an epoxy compound.

Generally, the connecting pieces 11 or the thinner sections 13 of the bridge pieces 3 between the pole teeth short-circuit the magnetic flux of the rotor, thus reducing the overall flux brought together by the phase coils and thereby also reducing the output torque of the motor. These connecting pieces 11 or thinner sections 13 can also lead to a non-sinusoidal waveform of the electromotive force when the motor is under load, which can increase an undulation of the electromagnetic moment. The use of connecting pieces 11 or thinner sections 13 also complicates the calculation of the electromagnetic properties of the motor because, for example, the optimization of the motor through the use of 2D finite element methods cannot be based on any known behavior of the precise modeling of such connecting pieces (or partially closed gap openings).

As indicated above, DE 102 42 404 and DE 102 03 272 partially overcome the above-described disadvantages; DE 102 42 404 simplifies the construction of the star-shaped core. The reduction in undulation of the electromagnetic torque that DE 102 03 272 achieves, however, has the disadvantage of a larger number of different forms of pole teeth 2, which must be manufactured and positioned in relation to one another.

SUMMARY OF THE INVENTION

The stator for an electric machine according to the invention, which has a core composed of lamination plates, and in which the pole teeth of each lamination plate of the core are connected to one another by means of respective bridge pieces 3 and connecting pieces 11, is embodied in such a way that the lamination plates of the core are composed of a two-state steel and have a high relative permeability in the region of the pole teeth while having a section with a low relative permeability in the region of the bridge pieces.

Correspondingly, the method according to the invention for manufacturing a stator, which is for an electric machine and has a core composed of lamination plates, and in which the pole teeth of each lamination plate of the core are connected to one another by means of respective bridge pieces, includes the following steps:

production of lamination plates out of a two-state steel with a high relative permeability and execution of a heat treatment of the lamination plates in the region of the bridge pieces, thus producing sections there with a low relative permeability.

According to the invention, the lamination plates can be stacked to produce the stator core before or after the heat treatment. The use according to the invention of lamination plates composed of two-state steel for the magnetic core in electric machines can achieve advantages with regard to both the mechanical and electromagnetic properties. With the two-state steel, the normally prevailing high magnetic permeability can be permanently reduced to the permeability of air in local regions by means of a heat treatment. The "gap openings" of the stator core are achieved by means of a demagnetization of the magnetic material, thus rendering it unnecessary to provide any complex bridge arrangements in the gap openings, i.e. the "gap openings" are comprised of continuous material that has a low relative permeability, preferably that of air. Such a "gap opening" is also referred to below as an "effective gap."

In addition, this method for producing effective gaps in a stator can be used in order to produce inclined effective gaps or any other form of effective gaps so as to reduce detent torques and oscillation in the electromagnetic moment. The invention makes it possible to produce inclined effective gaps or effective gaps of any shape without requiring the core to have actual physical recesses, i.e. the invention requires only one type of lamination plate to be produced.

The high relative permeability according to the invention is preferably in the vicinity of 900 or above while the low relative permeability according to the invention is preferably in the vicinity of 1. At these values, the effective gaps of the stator according to the invention can be produced by means of a heat treatment in which the material is heated to temperatures above 1100° C. so that the relative permeability is permanently reduced by approximately three orders of magnitude from approximately 900 to 1, i.e. to the relative permeability of air. According to the invention, this heating preferably occurs by means of a plasma welding head being moved over the sections that are to constitute the respective effective gaps.

The stator according to the invention is thus comprised of uniform one-piece soft magnetic lamination plates that have adjacent regions with high and low permeabilities. The heat-treated regions with low permeability continue to have the mechanical strength and integrity of the lamination plate originally provided with a high permeability.

According to the invention, the sections of the individual lamination plates are preferably embodied so that in the region of the respective bridge piece between each pair of pole teeth, the core has an effective gap with a low relative permeability that extends parallel to a center axis of the stator. This structural embodiment produces a stator according to DE 198 42 948 in which the mechanical strength is improved due to the absence of an actual physical gap in the material. In addition, the production is simplified due to the uniform design of the respective lamination plates.

Alternatively, the sections of the individual lamination plate according to the invention are preferably embodied so that in the region of the respective bridge piece between each pair of pole teeth, the core has an effective gap with a low relative permeability that extends inclined at a predetermined angle in relation to a center axis of the stator. This produces a stator according to DE 102 03 272 A1 while retaining the advantages mentioned in connection with DE 198 42 948.

As described above, the effective gap according to the invention, which is thus only a gap in terms of the permeability and not in terms of the material, can be embodied in any shape since it is produced by a heat treatment of the already assembled stator core. The effective gap can thus also be embodied so that it is inclined at a predetermined angle in relation to a center axis of the stator in a first half of the core and is inclined at the negative of the predetermined angle in relation to the center axis of the stator in a second half of the core, i.e. extends in a herringbone pattern.

The stator according to the invention is preferably segmented, with a flux return ring positioned around the core. Therefore, the steps of the stacking the lamination plates to produce a core, the heat treatment, the placement of coils onto the pole teeth of the core, and the insertion of the coil-equipped core into a flux return ring are executed in order to produce the stator according to the invention.

BRIEF DESCRIPTION OF THE DRAWINGS

Exemplary embodiments of the invention are explained in detail in the subsequent description, taken in conjunction with the drawings, in which.

DESCRIPTION OF THE PREFERRED EMBODIMENTS

A stator core according to a first exemplary embodiment of the present invention will be described below in conjunction with FIG. 1.

Figure 1:
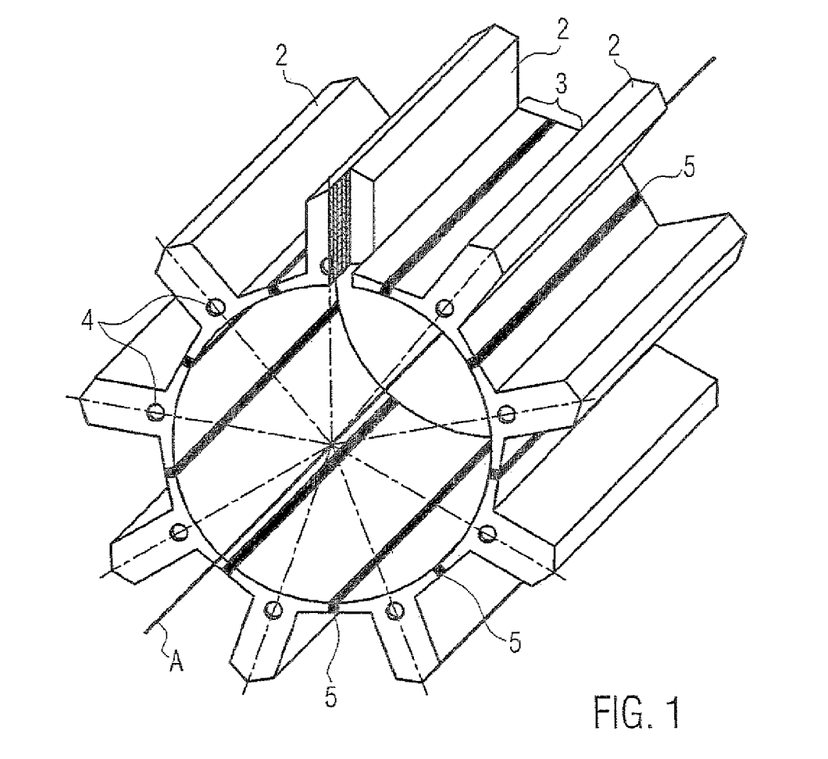
FIG. 1 is a schematic perspective view of a stator core according to a first exemplary embodiment of the invention.
Figure 2A:
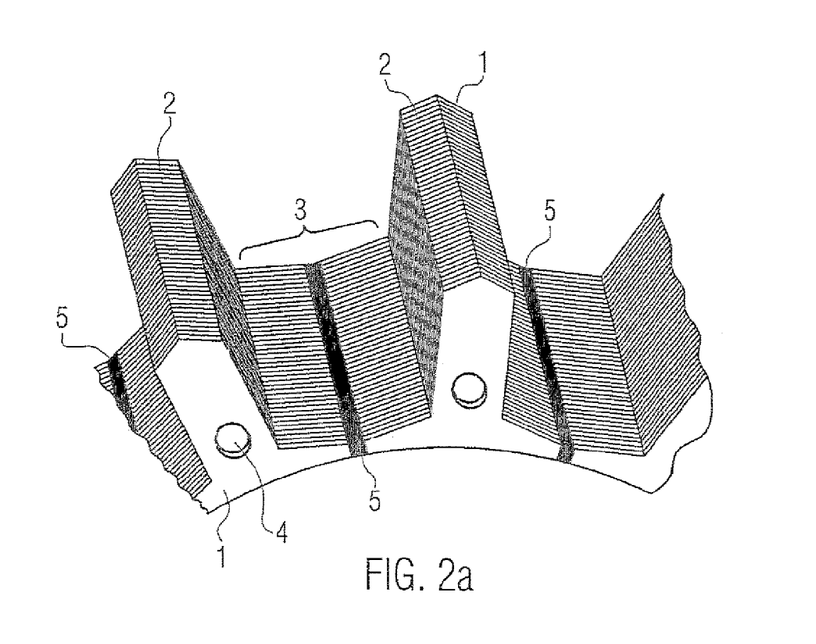
FIGS. 2a and 2b show schematic perspective detail views of the stator core shown in FIG. 1.
Figure 2B:
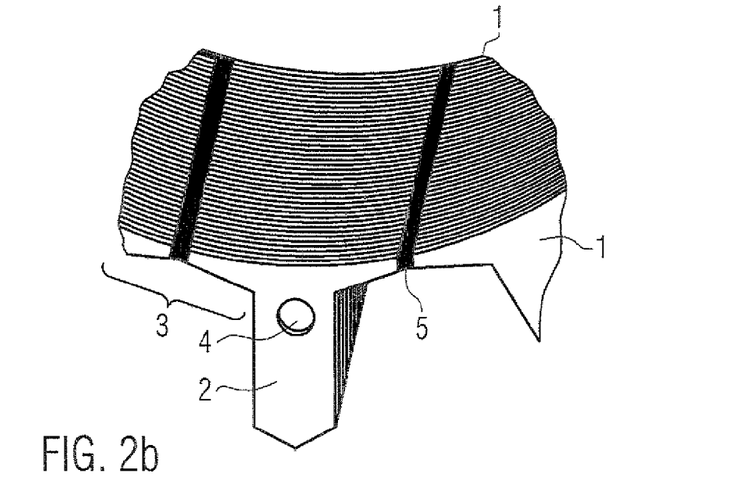

As is clear from FIG. 1, the stator core has a number of tooth-shaped, outwardly protruding pole teeth 2. Between two adjacent pole teeth 2, a respective bridge piece 3 is provided. The stator core is comprised of a plurality of individual plates 1 that are stacked one on top of another. The plates 1 are preferably stamped so that they can be manufactured with ease from a production engineering standpoint. FIGS. 2a and 2b are detail views of the stator core shown in FIG. 1 in which the individual lamination plates 1 are visible.

The bridge pieces 3 each have a heat-treated section 5 that has been heat-treated, for example, through the use of a plasma welding head in order to change the magnetic properties of the lamination plate 1 so that they are comparable to those of air, i.e. in order to produce an effective air gap 5 between the pole teeth 2. The low-permeability sections of the individual lamination plates 1 constitute a continuous effective gap 5 that extends parallel to a center axis A of the stator. These effective air gaps 5 produced between the pole teeth 2 are equivalent to the conventional air gaps in a conventionally manufactured stator core. It is also possible for the entire bridge pieces 3 to comprise the respective effective gap 5, i.e. for them to be heat-treated over their entire area.

As an alternative to the constant thickness shown in FIG. 1, the bridge pieces 3 can also taper don toward the middle between the pole teeth 2, as shown in FIGS. 2a and 2b. The effective gap 5 produced between two pole teeth 2 can, for example, be situated at the narrowest part of the lamination plate 1.

Each lamination plate 1 is attached to the adjoining lamination plate 1, preferably in the axial direction, by means of alternating recesses and protrusions 4, as is also the case in the prior art.

The two-state lamination plate according to the invention has magnetic or mechanical properties that are similar to or better than those of the conventional 0.5 mm thick silicon steel lamination plate, 1.0 mm thick non-alloyed, cold-rolled lamination plate, or a generally available soft magnetic powder material mixture (e.g. a soft magnetic composite material), that are usually used in electric machines with segmented stators; a stator core according to the invention is more mechanically stable in comparison to the stator cores described in the prior art since there are no interruptions in the material of the bridge pieces 3, but only a change in the magnetic properties.

Figure 3:
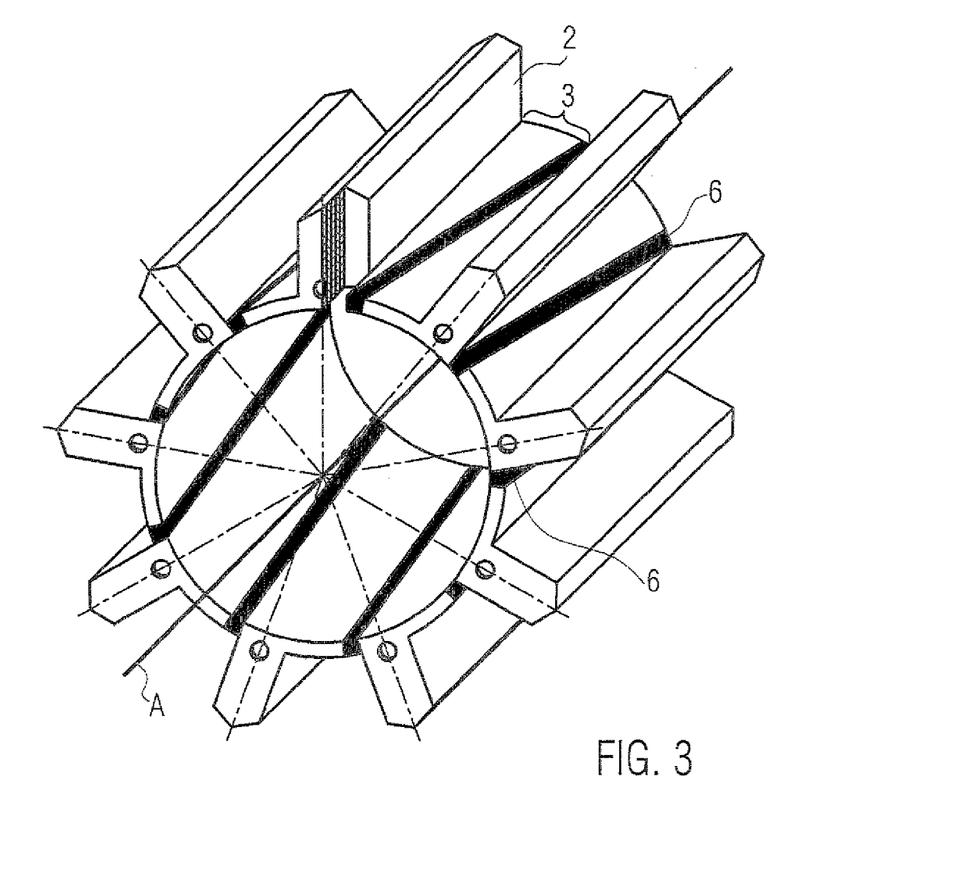
FIG. 3 is a schematic perspective view of a stator core according to a second exemplary embodiment of the invention.
Figure 4:
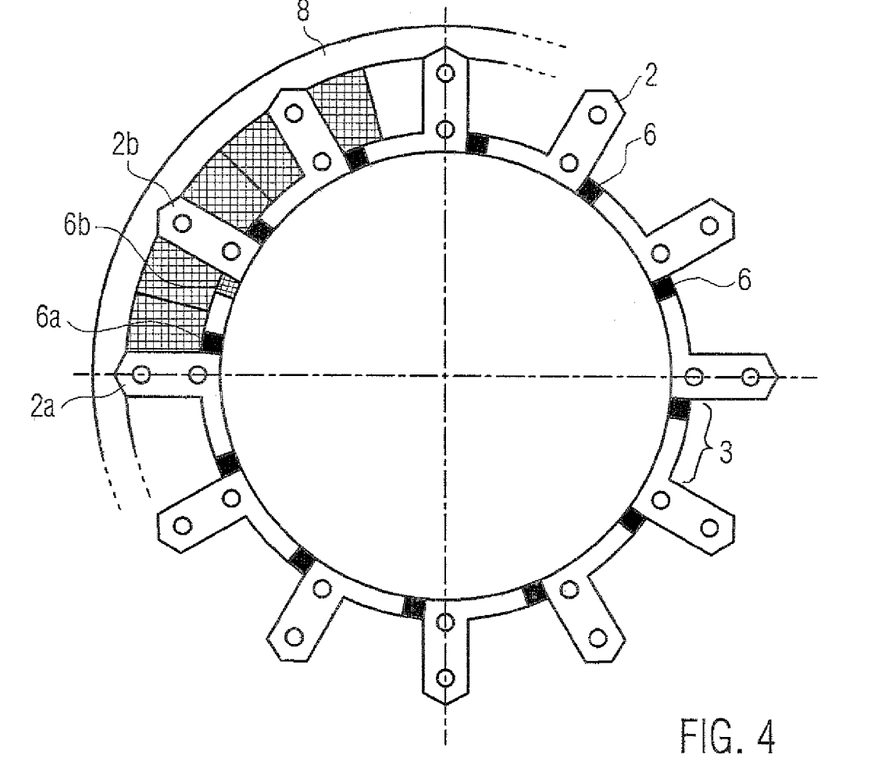
FIG. 4 is a top view of the stator core shown in FIG. 3, according to the second exemplary embodiment of the invention.
Figure 5:
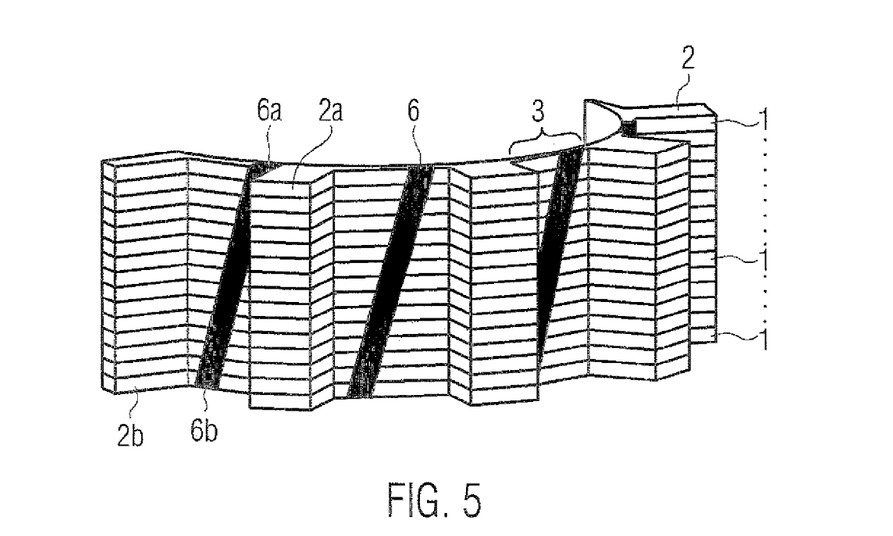
FIG. 5 is a schematic perspective partial view of the stator lamination stack that comprises the stator core of the second exemplary embodiment according to the invention shown in FIGS. 3 and 4.

FIGS. 3, 4, and 5 show a stator core according to the invention in a second exemplary embodiment of the invention in which the effective gaps 6 produced between the pole teeth 2 do not extend parallel to the center axis A of the stator, but instead extend inclined at a predetermined angle in relation to the center axis A of the stator. In this case, an effective gap 6 has an end 6a next to one pole tooth 2a at one end of the laminated stator packet and has an end 6b next to the adjacent pole tooth 2b at the other end of the laminated stator packet. In addition, FIG. 4 shows a flux return ring 8 into which the stator lamination stack is inserted. FIG. 5 is a perspective partial view of a stator core according to the invention in accordance with this second preferred embodiment in which the individual lamination plates 1 are visible.

Figure 6:
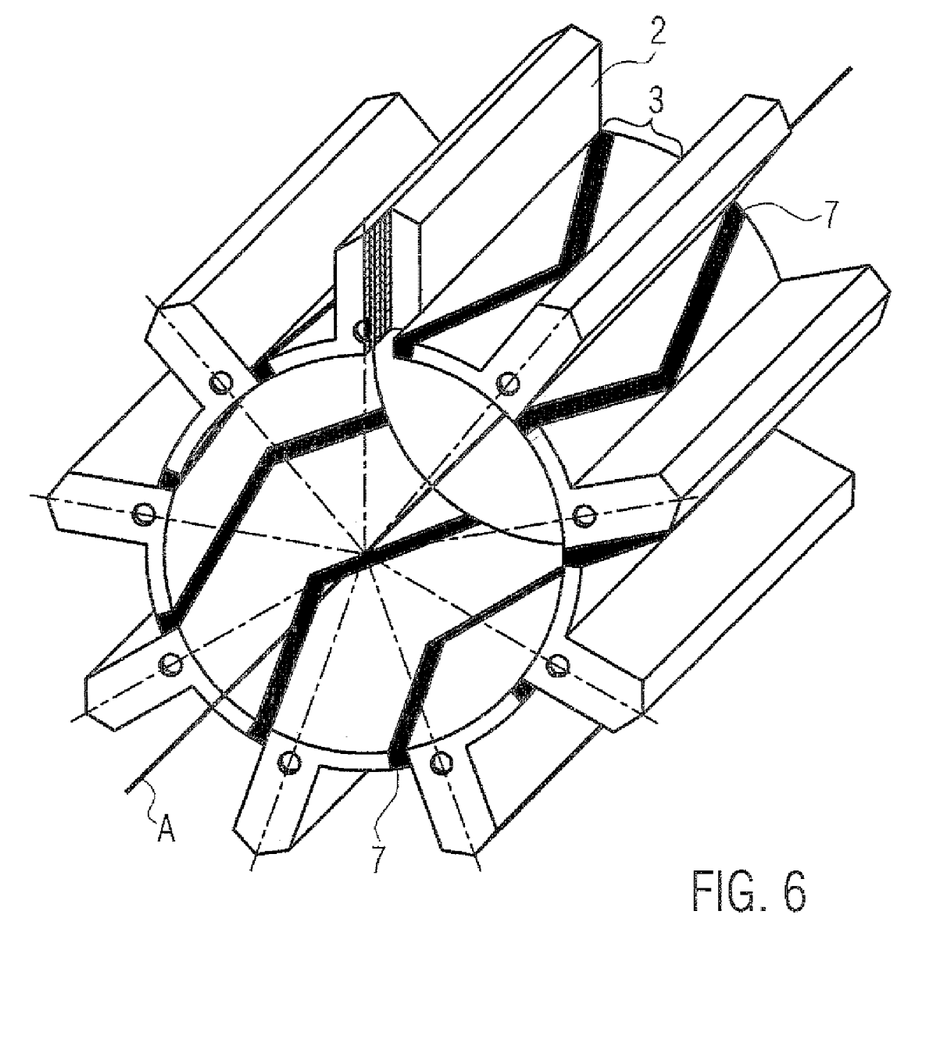
FIG. 6 is a schematic perspective view of a stator core according to a third exemplary embodiment of the invention.

FIG. 6 shows a third preferred embodiment of the stator core according to the invention in which the effective gaps 7 do not extend inclined at only one predetermined angle in relation to the center axis A of the stator, but instead are inclined at a predetermined angle in relation to the center axis A of the stator in a first half of the core and are inclined at the negative of the predetermined angle in relation to the center axis A of the stator in a second half of the core, i.e. extend in the shape of a V or in a herringbone pattern, and both ends of the effective gaps 7 are situated next to the same pole tooth.

FIGS. 1 through 6 demonstrate that the shape of an effective gap 5, 6, 7 can be freely selected since there are no interruptions in the material of the individual lamination plates 1. This permits an effective reduction of a detent torque and of oscillations in the electromagnetic moment, thus making it possible to reduce the vibration of electric machines. The heat treatment/demagnetization of the effective gaps 5, 6, 7 can occur after the stator core has been assembled, thus yielding gaps 5, 6, 7 with no offset between adjacent lamination plates 1, even when the effective gaps 6, 7 do not extend parallel to the center axis A of the stator.

The design of the star-shaped stator core according to the invention is simpler than that of the prior art since only one form of lamination plate 1 has to be manufactured and these lamination plates 1 do not have to be stacked on top of one another in a precise, predefined sequence.

Also, the invention does not require a dovetail guide to be provided at the junction of the lamination plates 1 and the flux return ring 8 in order to achieve and secure the radial position of the lamination plates 1. In addition, it is not necessary to encapsulate the entire stator in an epoxy compound in order to secure the radial position of the individual pole teeth 2.

According to the invention, the star-shaped stator core composed of the stacked lamination plates 1 needs only to be subjected to a heat treatment, e.g. by moving a plasma welding head over the sections of the lamination plates 1 that are to constitute the effective gap 5, 6, 7. It is naturally also possible to heat-treat each individual lamination plate 1 before the stator core is assembled.

The stator according to the invention has the electromagnetic advantage that no magnetic flux is short-circuited via the heat-treated demagnetized bridge pieces 3 since the bridge pieces 3 each have a continuous, uninterrupted effective gap 5, 6, 7 with the magnetic properties of air. This makes it possible to compensate for possibly existing poorer properties of the two-state steel and makes it possible to increase the torque of a motor in comparison to a motor that has a conventional stator core/flux return ring design and is constructed of conventional lamination plates. According to the present invention, sinusoidal waveforms of the electromagnetic force are produced even when the machine is operating under load. In additions the elimination of the magnetic bridges significantly simplifies the calculation and optimization of the electric machine.

The foregoing relates to the preferred exemplary embodiments of the invention, it being understood that other variants and embodiments thereof are possible within the spirit and scope of the invention, the latter being defined by the appended claims.

The invention claimed is:

1. A stator for an electric machine having a core comprising a plurality of lamination plates each having a plurality of pole teeth connected to one another by respective bridge pieces disposed between the pole teeth, said plurality of lamination plates of the core are comprised of a two-state steel, wherein said plurality of lamination plates have a high relative permeability in a region of the pole teeth and have a low relative permeability in a section in a region of the bridge pieces, wherein the section of the individual lamination plates are embodied so that in the region of the respective bridge piece between each pair of pole teeth the core has an effective gap with a low relative permeability, and wherein the gap is continuous and has no offset between adjacent lamination plates of the stator.

2. The stator according to claim 1, wherein the high relative permeability is 900 or above.

3. The stator according to claim 1, wherein the low relative permeability is approximately 1.

4. The stator according to claim 2, wherein the low relative permeability is approximately 1.

5. The stator according to claim 1, wherein said effective gap extends parallel to a center axis (A) of the stator.

6. The stator according to claim 4, wherein the sections of the individual lamination plates are embodied so that in the region of the respective bridge piece between each pair of pole teeth, the core has an effective gap with a low relative permeability, wherein said effective gap extends parallel to a center axis (A) of the stator.

7. The stator according to claim 1, wherein the sections of the individual lamination plates are embodied so that in the region of the respective bridge piece between each pair of pole teeth, the core has an effective gap with a low relative permeability, wherein said effective gap extends inclined at a predetermined angle in relation to a center axis (A) of the stator.

8. The stator according to claim 4, wherein the sections of the individual lamination plates are embodied so that in the region of the respective bridge piece between each pair of pole teeth, the core has an effective gap with a low relative permeability, wherein said effective gap extends inclined at a predetermined angle in relation to a center axis (A) of the stator.

9. The stator according to claim 1, wherein the sections of the individual lamination plates are embodied so that in the region of the respective bridge piece between each pair of pole teeth, the core has an effective gap with a low relative permeability, wherein said effective gap extends inclined at a predetermined angle in relation to a center axis (A) of the stator in a first half of the core and extends inclined at the negative of the predetermined angle in relation to the center axis (A) of the stator a second half of the core.

10. The stator according to claim 4, wherein the sections of the individual lamination plates are embodied so that in the region of the respective bridge piece between each pair of pole teeth, the core has an effective gap with a low relative permeability, wherein said effective gap extends inclined at a predetermined angle in relation to a center axis (A) of the stator in a first half of the core and extends inclined at the negative of the predetermined angle in relation to the center axis (A) of the stator a second half of the core.

11. The stator according to claim 1, wherein said stator is a segmented stator that has a flux return ring situated around the core.

12. A method for manufacturing a stator for an electric machine having a core comprising a plurality of lamination plates each having a plurality of pole teeth connected to one another by respective bridge pieces disposed between the pole teeth, said method comprising the steps of:
    producing the plurality of lamination plates composed of a two-state steel with a high relative permeability; and
    executing a heat treatment of the plurality of lamination plates in a region of the bridge pieces, thereby producing sections possessing a low relative permeability and yielding a continuous effective gap with no offset between adjacent lamination plates.

13. The method according to claim 12, wherein the high relative permeability is in the vicinity of 900 or above.

14. The method according to claim 12, wherein the low relative permeability is in the vicinity of 1.

15. The method according to claim 12, wherein the heat treatment includes a heating of the sections of the bridge pieces to temperatures of greater than 1100° C.

16. The method according to claim 12, wherein the heating of the sections of the bridge pieces includes the stop of moving a plasma welding head over the sections.

17. The method according to claim 12, wherein the sections of the individual lamination plates are embodied so that in the region of the respective bridge piece between each pair of pole teeth, wherein said effective gap extends parallel to a center axis (A) of the stator.

18. The method according to claim 12, wherein the sections of the individual lamination plates are embodied so that in the region of the respective bridge piece between each pair of pole teeth, the core has an effective gap with a low relative permeability, wherein said effective gap extends inclined at a predetermined angle in relation to a center axis (A) of the stator.

19. The method according to claim 12, wherein the sections of the individual lamination plates are embodied so that in the region of the respective bridge piece between each pair of pole teeth, the core has an effective gap with a low relative permeability, wherein said effective gap extends inclined at a predetermined angle in relation to the center axis (A) of the stator in a first half of the core and extends inclined at the negative of the predetermined angle in relation to the center axis (A) of the stator in a second half of the core.

20. The method according to claim 12, further including the steps of:
    stacking said plurality of lamination plates to form the core;
    attaching coils onto the pole teeth of the core resulting in a coil-equipped core; and
    inserting the coil-equipped core into a flux return ring.

21. The method according to claim 12, wherein the heat treatment of the plurality of lamination plates in the region of the bridge pieces extends over the entire area of the bridge pieces so that the entire bridge pieces comprise sections possessing a low relative permeability.

22. The method according to claim 12, wherein the heat treatment of the plurality of lamination plates in the region of the bridge pieces is performed after the lamination plates have been stacked to form the core.

* * * * *